US008182260B2

(12) United States Patent
Ott

(10) Patent No.: US 8,182,260 B2
(45) Date of Patent: May 22, 2012

(54) APPARATUS AND METHOD FOR FORMING TAPERED PRODUCTS

(75) Inventor: Josef Ott, Hagerstown, MD (US)

(73) Assignee: Rampf Molds Industries, Inc., Hagerstown, MD (US)

( * ) Notice: Subject to any disclaimer, the term of this patent is extended or adjusted under 35 U.S.C. 154(b) by 126 days.

(21) Appl. No.: 11/819,159

(22) Filed: Jun. 25, 2007

(65) Prior Publication Data

US 2008/0315458 A1 Dec. 25, 2008

(51) Int. Cl.

| | |
|---|---|
| ***A01J 21/00*** | (2006.01) |
| ***B28B 1/00*** | (2006.01) |
| ***B41B 11/54*** | (2006.01) |
| *B28B 3/00* | (2006.01) |
| *B28B 7/00* | (2006.01) |

(52) U.S. Cl. ........ 425/442; 425/181; 425/253; 425/424; 425/436 R; 425/441; 425/443; 425/452; 425/454; 249/118; 249/129; 249/137; 249/162; 249/170; 249/171; 264/333; 264/334

(58) Field of Classification Search .................... 425/62, 425/181, 454, 253, 424, 436 R, 441, 442, 425/443, 452; 249/118, 129, 137, 162, 170, 249/171; 264/333, 334

See application file for complete search history.

(56) References Cited

U.S. PATENT DOCUMENTS

| | | | |
|---|---|---|---|
| 805,914 | A | 11/1905 | Horr |
| 813,592 | A | 2/1906 | Schou |
| 2,075,992 | A | 4/1937 | Lux et al. |
| 2,339,792 | A | 1/1944 | Milano |
| 2,479,350 | A | 8/1949 | Haggart, Jr. |
| 2,869,179 | A | 1/1959 | Van Hartesveldt |
| 2,887,755 | A | 5/1959 | Zevely |
| 3,593,373 | A | 7/1971 | Loomis |
| 3,694,128 | A | 9/1972 | Foxen |
| 3,932,098 | A | 1/1976 | Huber et al. |
| 3,940,229 | A | 2/1976 | Hutton |
| 4,179,258 | A | 12/1979 | Karas et al. |
| 4,235,580 | A | 11/1980 | Springs et al. |
| 4,407,766 | A | 10/1983 | Haardt et al. |
| 4,421,471 | A | 12/1983 | Vogt |

(Continued)

FOREIGN PATENT DOCUMENTS

CA 2463194 A1 * 10/2004

(Continued)

*Primary Examiner* — Christina Johnson
*Assistant Examiner* — Atul P Khare
(74) *Attorney, Agent, or Firm* — Burr & Brown

(57) ABSTRACT

The present invention relates to an apparatus and method for forming molded tapered products, such as masonry blocks, whereby high quality finished products are removed from their mold without the need for complex machinery for demolding. The mold may include one or more mold cavities having one or more movable cavity walls. The movable cavity walls may include an end liner having a planar product forming surface capable of moving from a vertical position to an angled position. Tapered products may be formed by moving the mold towards a pallet so that the pallet engages with the end liner and causes the end liner to move from the vertical position to the angled position. Moldable material may then be introduced into the mold cavity and may be allowed to remain in the mold cavity until it is self-sustaining. The mold may then be moved away from the pallet such that a molded product remains on the pallet, thereby allowing the end liner to move from the angled position to the vertical position.

7 Claims, 9 Drawing Sheets

U.S. PATENT DOCUMENTS

| | | | | |
|---|---|---|---|---|
| 4,545,754 | A | 10/1985 | Scheidt et al. | |
| 4,735,562 | A | 4/1988 | Boutellier | |
| 4,941,813 | A | 7/1990 | Grubb et al. | |
| 5,078,940 | A | 1/1992 | Sayles | |
| 5,217,630 | A | 6/1993 | Sayles | |
| 5,445,514 | A | 8/1995 | Heiz | |
| 5,533,885 | A | 7/1996 | Schlusselbauer | |
| 5,879,603 | A | 3/1999 | Sievert | |
| 5,943,827 | A | 8/1999 | Okerlund | |
| 5,952,015 | A * | 9/1999 | DeWyre et al. | 425/186 |
| 6,113,379 | A | 9/2000 | LaCroix et al. | |
| 6,138,983 | A | 10/2000 | Sievert | |
| 6,209,848 | B1 | 4/2001 | Bolles et al. | |
| 6,224,815 | B1 | 5/2001 | LaCroix et al. | |
| 6,280,566 | B1 | 8/2001 | Naito et al. | |
| 6,464,199 | B1 | 10/2002 | Johnso | |
| 6,488,491 | B1 | 12/2002 | Nelson et al. | |
| 6,530,769 | B1 | 3/2003 | Rondeau et al. | |
| 7,140,867 | B2 * | 11/2006 | Scherer et al. | 425/413 |
| 7,208,112 | B2 * | 4/2007 | Scherer | 264/219 |
| 7,291,306 | B2 | 11/2007 | Ishler | |
| 2002/0025357 | A1 | 2/2002 | Spangenberg et al. | |
| 2003/0126821 | A1 * | 7/2003 | Scherer et al. | 52/604 |
| 2003/0164574 | A1 | 9/2003 | Hammer et al. | |
| 2005/0116389 | A1 | 6/2005 | Hammer et al. | |

FOREIGN PATENT DOCUMENTS

| | | | |
|---|---|---|---|
| DE | 25 30 098 | | 1/1977 |
| DE | 29 37 704 | | 3/1981 |
| DE | 4336744 | | 5/1995 |
| DE | 195 46 745 | | 6/1997 |
| DE | 196 34 499 | | 3/1998 |
| DE | 19634499 | A1 * | 3/1998 |
| DE | 196 39 640 | | 4/1998 |
| GB | 2216839 | | 10/1989 |
| JP | 2001191314 | A | 7/2001 |

* cited by examiner

APPARATUS AND METHOD FOR FORMING TAPERED PRODUCTS

FIELD OF THE INVENTION

The present invention relates to concrete-based product making machinery. More particularly, the invention relates to machinery for producing concrete-based products having a vertical taper, and the removal of such units from their molds.

BACKGROUND OF THE INVENTION

Concrete masonry units are available in a wide range of sizes and shapes, and are used for a variety of applications, ranging from concrete blocks and bricks to segmented wall blocks.

Generally, masonry units are produced using an automated process. The typical automated process for producing the units includes placing a mold, which is open at the top and bottom, on a solid pallet. The mold is then filled with a suitable composite material (generally comprising concrete and aggregate material). Next, the filled mold and/or pallet may be vibrated while the material is simultaneously compacted within the mold using a compression head inserted into the top of the mold to increase the density of the composite material. The molded composite material may then be stripped from the mold (while still resting on the pallet) and cured to form a building unit such as, but not limited to, a brick or a paver block.

Often, it is desirable to produce masonry units having at least one tapered vertical edge (e.g., the width of the top of unit is different from the width of the bottom of the unit). These masonry units are generally produced using a mold having one or more angled side walls. However, stripping the molded composite material from these molds is difficult because the side walls must be moved away from the composite material before the molded unit may be removed from the mold. Therefore, special molds are typically used to create tapered masonry units.

One prior attempt at creating tapered masonry units has been to use a "tilt-over" mold, such as the apparatus described in U.S. Pat. No. 4,735,562 to Boutellier. Tilt-over molds are inverted during the filling and forming process and are then turned over to remove the molded unit. However, tilt-over molding requires complex machinery and results in longer production times. Further, turning the mold upside down can damage the inverted face of the finished unit, which is typically not completely cured during the de-molding step. Because damaged units are normally rejected, manufacturing prices are increased.

Another technique involves the use of a mold having product-forming walls that may be retracted away from the molded unit. Such retractable walls are typically actuated in multiple directions by hydraulically and/or pneumatically operated machinery which may be bulky and which may require separate power and controls. Such arrangements add complexity and cost to the manufacturing process. They also reduce the usable mold space, thereby yielding fewer finished units per manufacturing cycle.

Yet another attempt at creating tapered masonry units has been to use hinged walls which are pivotally connected at a point within the mold cavities. In this technique, as the mold is placed on a pallet, the walls may be forced into an angled position, thereby creating a mold having a tapered edge. However, this technique has been found to be unsuitable because the hinged walls may pivot out of position during the vibrating step discussed above. As a result, the tapered walls of the masonry product may become deformed and unusable.

Therefore, a less complex, cost-effective apparatus and method for creating high quality tapered products is desirable.

SUMMARY OF THE INVENTION

The present invention relates to concrete-based product making machinery. More particularly, the invention relates to machinery for producing concrete-based products having a vertical taper, and the removal of such units from their molds.

One embodiment of the present invention includes a mold for forming a molded product having at least one tapered wall. The mold may comprise a frame and at least one mold cavity, the at least one mold cavity having a plurality of cavity walls defining the sides of the mold cavity, and the at least one mold cavity having an open top through which moldable material can be introduced into the mold cavity. The at least one of the plurality of cavity walls may be a movable wall comprising a stationary element having a groove and being attached to the frame, a pivot element, the pivot element being rotatably attached to the stationary element, and a movable element having a planar product forming surface. The movable element may be slidably and rotatably attached to the groove of the stationary element and the movable element may be rotatably attached to the pivot element such that the movable element is capable of moving between a first position and a second position.

Another embodiment of the present invention may include a method of forming a tapered molded product with a mold. The method may include the step of moving a mold towards a pallet, the mold comprising a frame and at least one mold cavity, the at least one mold cavity having a plurality of cavity walls defining the sides of the mold cavity, and the at least one mold cavity having an open top through which moldable material can be introduced into the mold cavity, wherein at least one of the plurality of cavity walls is a movable wall, the movable wall including a stationary element attached to the frame, the stationary element having a groove, a pivot element, the pivot element being rotatably attached to the stationary element, and a movable element having a planar product forming surface, the movable element being slidably and rotatably attached to the groove of the stationary element and the movable element being rotatably attached to the pivot element, such that the movable element is capable of moving between a first position and a second position. The method may also include the steps of engaging the pallet with the movable element such that the pallet forces the movable element from the first position to the second position, introducing a quantity of moldable material into the at least one mold cavity while the movable element is in the second position, allowing the moldable material to remain in the at least one mold cavity until it forms a self-sustaining molded product while the movable element is in the second position, and moving the mold away from the pallet such that the self-sustaining molded product remains on the pallet and the movable element moves from the second position to the first position.

These and other objects and advantages of the invention will be apparent from the following description, the accompanying drawings and the appended claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Figure 1:
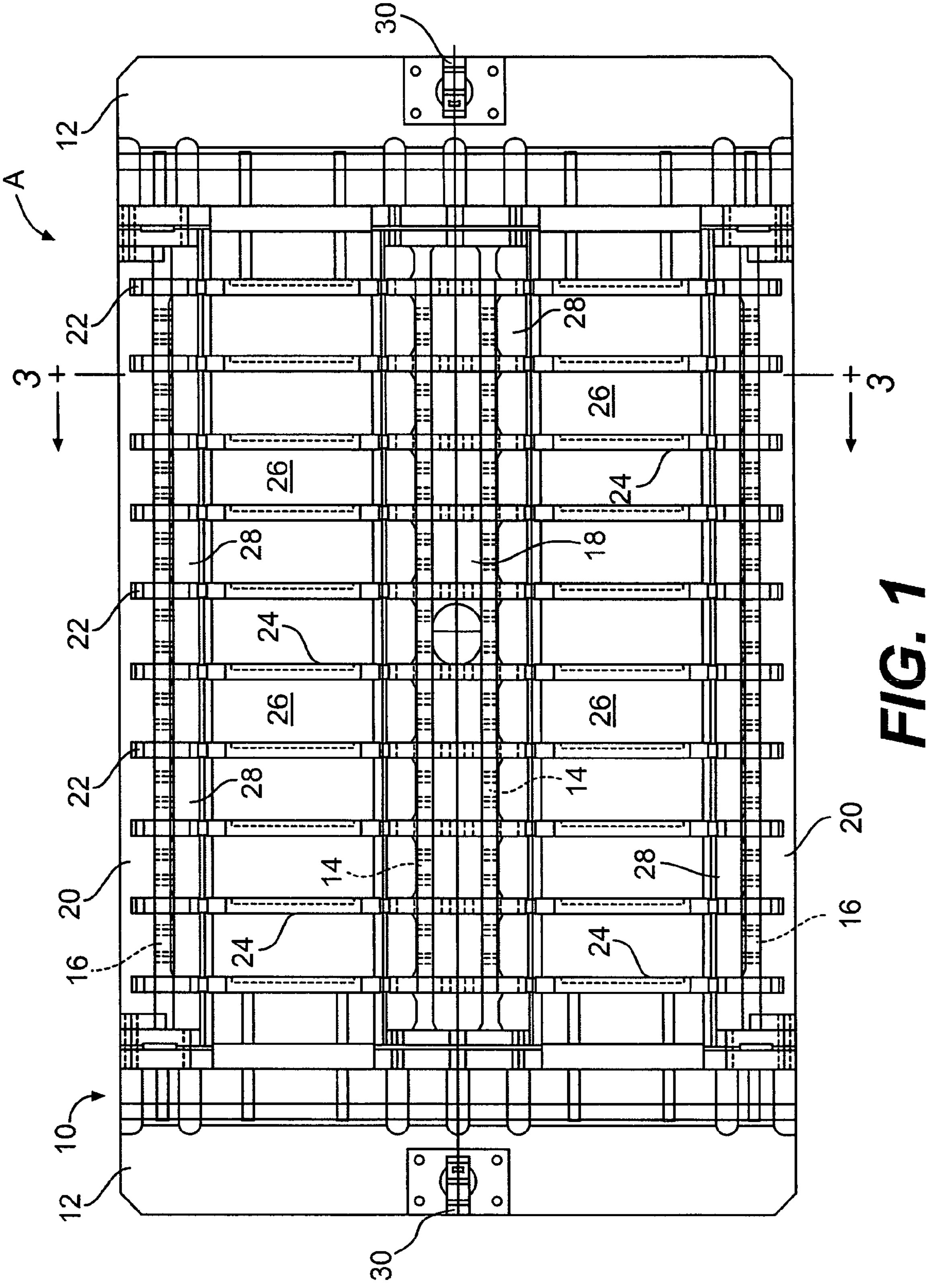
FIG. 1 is a top view of a mold assembly according to one embodiment of the present invention.
Figure 2:
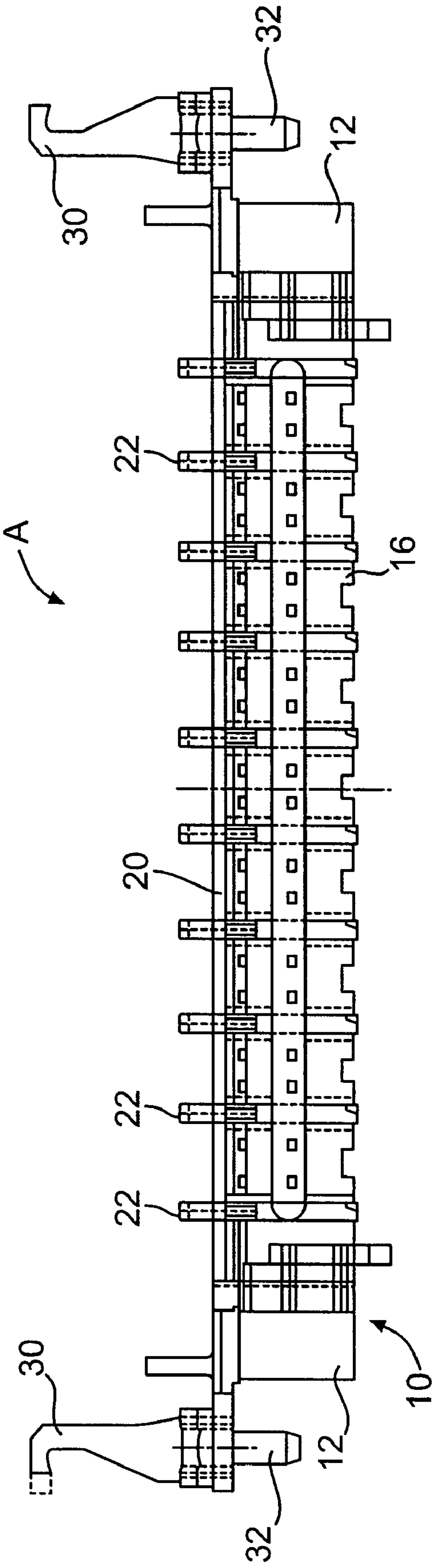
FIG. 2 is a side view of a mold assembly according to one embodiment of the present invention.

FIG. 1 is a top view of a mold assembly A and FIG. 2 is a side view of mold assembly A according to one embodiment of the present invention. As illustrated in the Figures, mold assembly A may include a frame 10. The frame 10 may include side brackets 12, center bars 14 and end bars 16. The side brackets may be connected to center bars 14 and end bars 16 using any conventional means for attaching two mechanical elements including, but not limited to, bolting, welding, gluing and screwing. A center cover plate 18 may be attached to center bars 14 and an end cover plate 20 may be attached to each end bar 16. Division plates 22 may be attached through the center cover plate 18 and the end cover plates 20 to define fixed, parallel side walls 24 of mold cavities 26. The end walls 28 of each mold cavity 26 may be defined by movable end liners 340 and 345 having product forming surfaces 341 and 346, as discussed in detail below with reference to FIGS. 3A and 3B.

In one embodiment of the present invention, the various elements of mold assembly A may be manufactured from any material having sufficient strength to withstand the forces associated with the production of molded masonry units. This may include, but is not limited to, steel, titanium, carbon fiber, composite materials, carbide, ceramics or other common materials known to one of skill in the art.

It should be noted that each side wall 24, end wall 28 and mold cavity 26 is not labeled in FIGS. 1 and 2. However, the embodiment illustrated in FIGS. 1 and 2 includes eighteen mold cavities 26. Further, it is contemplated that mold assembly A may be configured to have any number of mold cavities in any configuration to increase or decrease the number of tapered masonry units simultaneously produced by a mold assembly. It should be noted that this includes a mold assembly A having only a single mold cavity 26.

In one embodiment of the present invention, a hanger 30 may be connected to each side bracket 12. The hanger 30 may facilitate movement of the mold assembly A by production machinery (not shown). While a hanger 30 is illustrated in the FIGS., it is contemplated that any means for attaching mold assembly A to production machinery (not shown) is contemplated including, but not limited to, bolting, welding, screwing, hydraulic clamping and air clamping.

Additionally, mold assembly A may include a guide pin 32 located on one or both side brackets 12 which may facilitate alignment of mold assembly A in relation to other equipment, as is well known to those of ordinary skill in the art. Alternatively, side brackets 12 may be provided with bolt holes or keyways to facilitate handling and alignment.

Figure 3A:
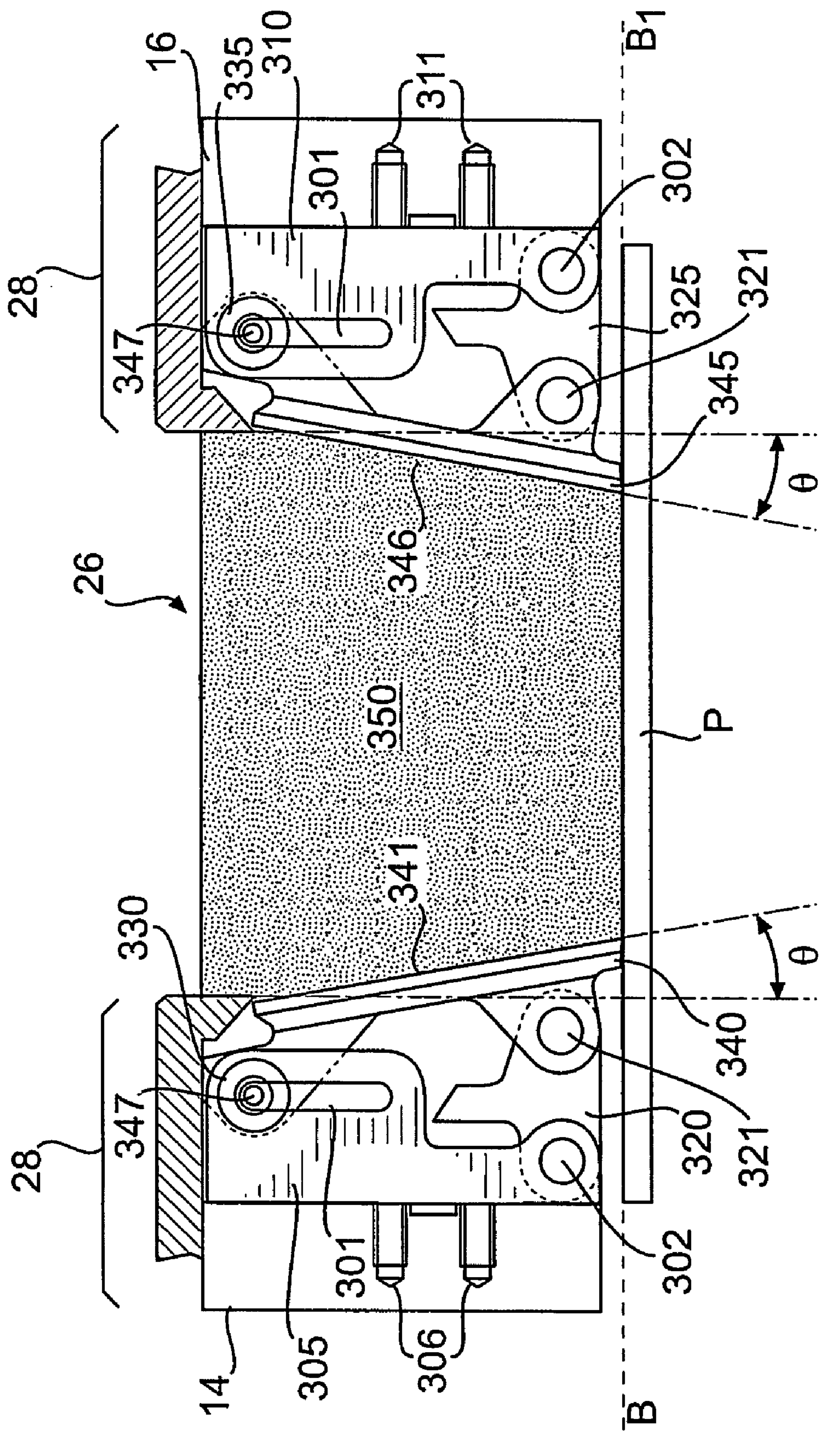
FIGS. 3A and 3B are side views of a single mold cavity according to the present invention.
Figure 3B:
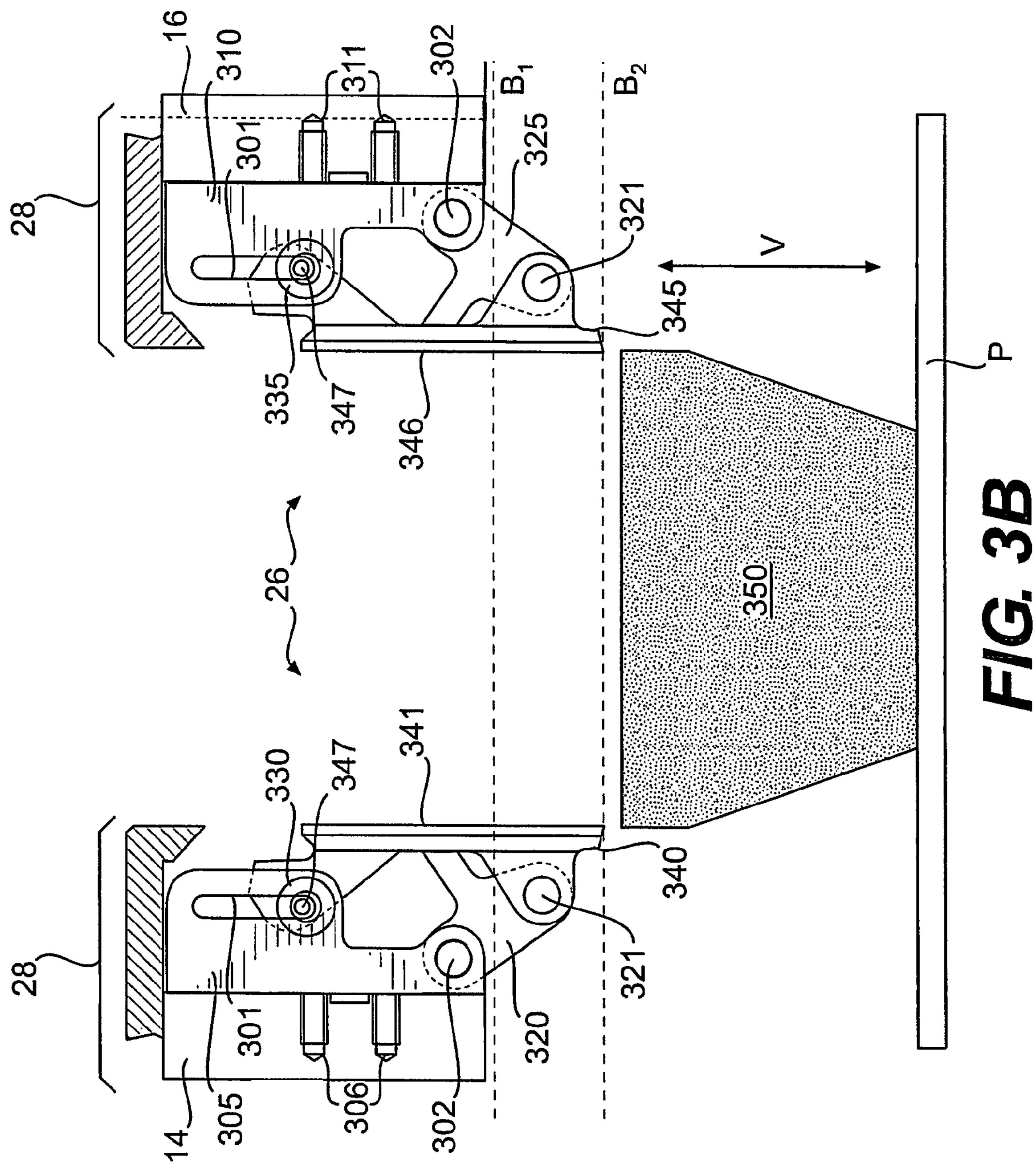

FIGS. 3A and 3B are side views of a mold assembly according to one embodiment of the present invention. The various elements illustrated in FIGS. 3A and 3B may be manufactured from any material known in the art and having sufficient strength to withstand the forces associated with the production of molded masonry units. This may include, but is not limited to, steel, titanium, carbon fiber, composite materials and ceramics.

In one embodiment of the present invention, a mold assembly may include back plates 305 and 310, as illustrated in FIGS. 3A and 3B. Each back plate 305 and 310 may include a slot or channel 301 and a pivot point 302. Further, each back plate 305 and 310 may be affixed to an end bar 16 or a center bar 14 of frame 10.

A mold assembly according to the present invention may also include linkages 320 and 325. Each linkage 320 and 325 may include pivot points 302 and 321. As illustrated in FIGS. 3A and 3B, linkages 320 and 325 may be rotatably attached to one of the back plates 305 or 310 at pivot point 302 using any conventional means for rotatably attaching two points including, but not limited to, the use of screws, pins or rivets. Linkages 320 and 325 may also be rotatably attached to one of the end liners 340 or 345, as discussed below, at pivot point 321 using any conventional means for rotatably attaching two points including, but not limited to, the use of screws, pins or rivets.

A mold assembly according to the present invention may also include cams 330 and 335 and end liners 340 and 345, as illustrated in FIGS. 3A and 3B. Each end liner 340 and 345 may include an attachment point 347 and a pivot point 321. Further, each end liner 340 and 345 may include a product forming surface 341 or 346. In one embodiment, product forming surfaces 341 and 346 may be planar surfaces. However, it is contemplated that the product forming surfaces 341 and 346 may be any type of surface including, but not limited to, textured, rounded, ridged or any other surface known to one of skill in the art.

Further, in one exemplary embodiment of the present invention, the product forming surface may have a rectangular shape measuring approximately 100 mm by approximately 150 mm. However, it should be realized by one of ordinary skill in the art that any shape or dimensions may be utilized depending on the type of tapered block to be formed.

As illustrated in the FIGS., each cam 330 or 335 may be rotatably attached at point 347 on end liner 340 or 345 and may be configured to slidably engage slot 301 in one of the back plates 305 or 310. Each end liner 340 and 345 may also be rotatably attached to one of the linkages 320 or 325 at pivot point 321 using any conventional means for rotatably attaching two points including, but not limited to, the use of screws, pins or rivets.

FIGS. 3A and 3B illustrate a split sectional view of a mold cavity 26 taken along Line 3-3 in FIG. 1. As illustrated, each end wall 28 may include a back plate 305 or 310. Back plate 305 may be attached to a center bar 14 and back plate 310 may be attached to an end bar 16 using bolts 306 and 311. While bolts 306 and 311 may be illustrated, it is contemplated that any conventional means for attaching two mechanical elements including, but not limited to, welding, screwing and gluing may also be used to attach the back plates 305 and 311 to the center bar 14 or the end bar 16.

FIG. 3A illustrates a mold cavity 26 with closed end walls 28 according to one embodiment of the present invention and FIG. 3B illustrates a mold cavity 26 having open end walls 28 according to one embodiment of the present invention. Because the various elements of each end wall 28 are rotatably or slidably attached as illustrated in FIGS. 3A and 3B and as discussed above, end liners 340 and 345 may be permitted to move between a closed position (FIG. 3A) to an open position (FIG. 3B). In the closed position, as illustrated in FIG. 3A, the product forming surfaces 341 and 346 may be configured at an angle Θ from vertical. In one exemplary embodiment of the present invention, angle Θ may be approximately 78 degrees, creating blocks having an interior angle of approximately 102 degrees. However, one of ordinary skill in the art will recognize that the various elements of each end wall 28 may be configured so that the angle Θ may have any value to accommodate the manufacture of products having sides with any angle of taper.

As one of ordinary skill in the art will realize by comparing FIGS. 3A and 3B, the movement of the end liners 340 and 345 occurs when the cams 330 and 335 slide along grooves 301. This may cause the various elements of each end wall 28 to slide and pivot with respect to one another due to their rotatable connections, discussed above. The movement of the elements may be caused by upward forces and gravitational forces acting on the end liners 340 or 345, as discussed below with reference to FIGS. 4A to 4E. Furthermore, one advantage of the present invention is that, in the open position (FIG. 3B), the product forming surfaces 341 and 346 may be cleared of any residual product because they are held in the vertical position whereby gravity may clear the residual product. Furthermore, one of ordinary skill in the art will realize that the vertical movement of the tapered product 350 (as discussed below) will assist in clearing any residual product from the product forming surfaces 341 and 346. Thus, the product forming surfaces 341 and 346 may not require cleaning as often as required by prior art machinery.

As discussed in detail with reference to FIGS. 4A to 4F, the mold cavity A may be configured to rest on a pallet P which may be configured to hold a molded product 350. When the mold assembly A is not resting on a pallet P, the product forming surfaces 341 and 346 may be configured in an open configuration, as illustrated in FIG. 3B. Because there is no surface in contact with the bottom of end liners 340 and 345, the end liners 340 and 345 and the linkages 320 and 325 may be allowed to drop below the bottom of the mold cavity 26 (illustrated in the FIGS. as Line $B_1$) due to the gravitational force acting on the mass of the end liners 340 and 345. As the mold assembly A is moved in the direction of Arrow V by conventional production machinery known to those skilled in the art (not shown), the bottom of the mold cavity 26 may move closer to the pallet P. When the pallet P reaches Line $B_2$, it may begin to force end liners 340 and 345 upwards in the direction of Arrow V until the end liners 340 and 345 are in the closed configuration illustrated in FIG. 3A. In one exemplary embodiment of the present invention, end liners 340 and 345 may be forced upwards in the direction of Arrow V when the pallet P is approximately 5.5 cm below line $B_1$. In this embodiment, an additional 18 cm of movement in the direction of Arrow V may be required for a formed product to completely clear the bottom of end liners 340 and 345. While these specific distances are provided, it should be realized that any possible distance of travel may be required depending on the size of the block to be manufactured. Additionally, in alternative embodiments, the mold assembly A may be held stationary and the pallet P may be moved upwards in the direction of Arrow V using conventional production machinery known to those skilled in the art.

Figure 4A:
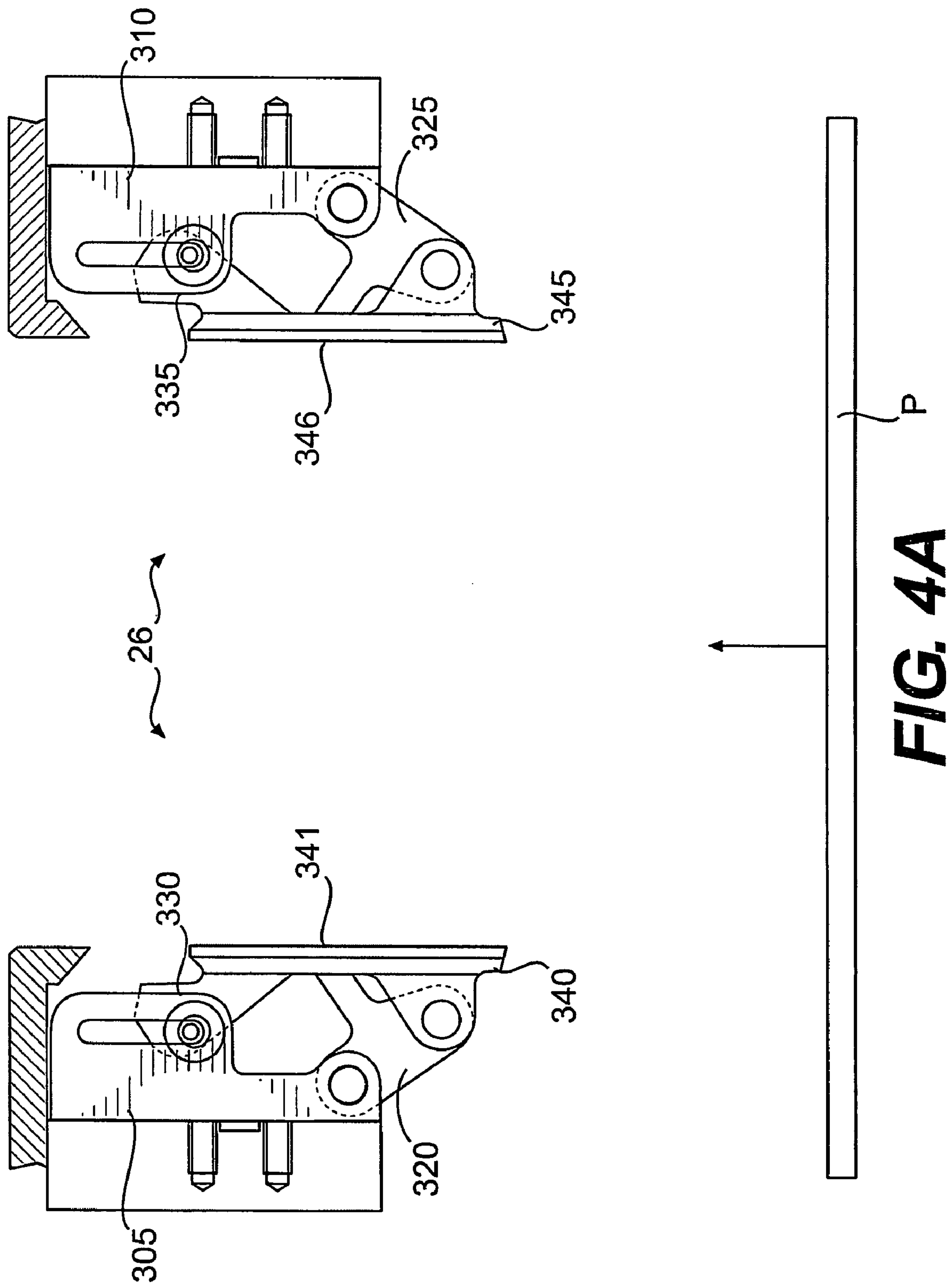
FIGS. 4A to 4E illustrate the method of use and operation of the end walls 28 to form a tapered product according to one embodiment of the present invention.

FIGS. 4A to 4E illustrate the method of use and operation of the end walls 28 to form a tapered product 350 according to one embodiment of the present invention. In FIG. 4A, the end liners 340 and 345 are illustrated as being in an open configuration, similar to the configuration illustrated in FIG. 3B. As illustrated by the arrows in FIG. 4A, the pallet P and the mold assembly A may be moved towards one another, as discussed above.

Figure 4B:
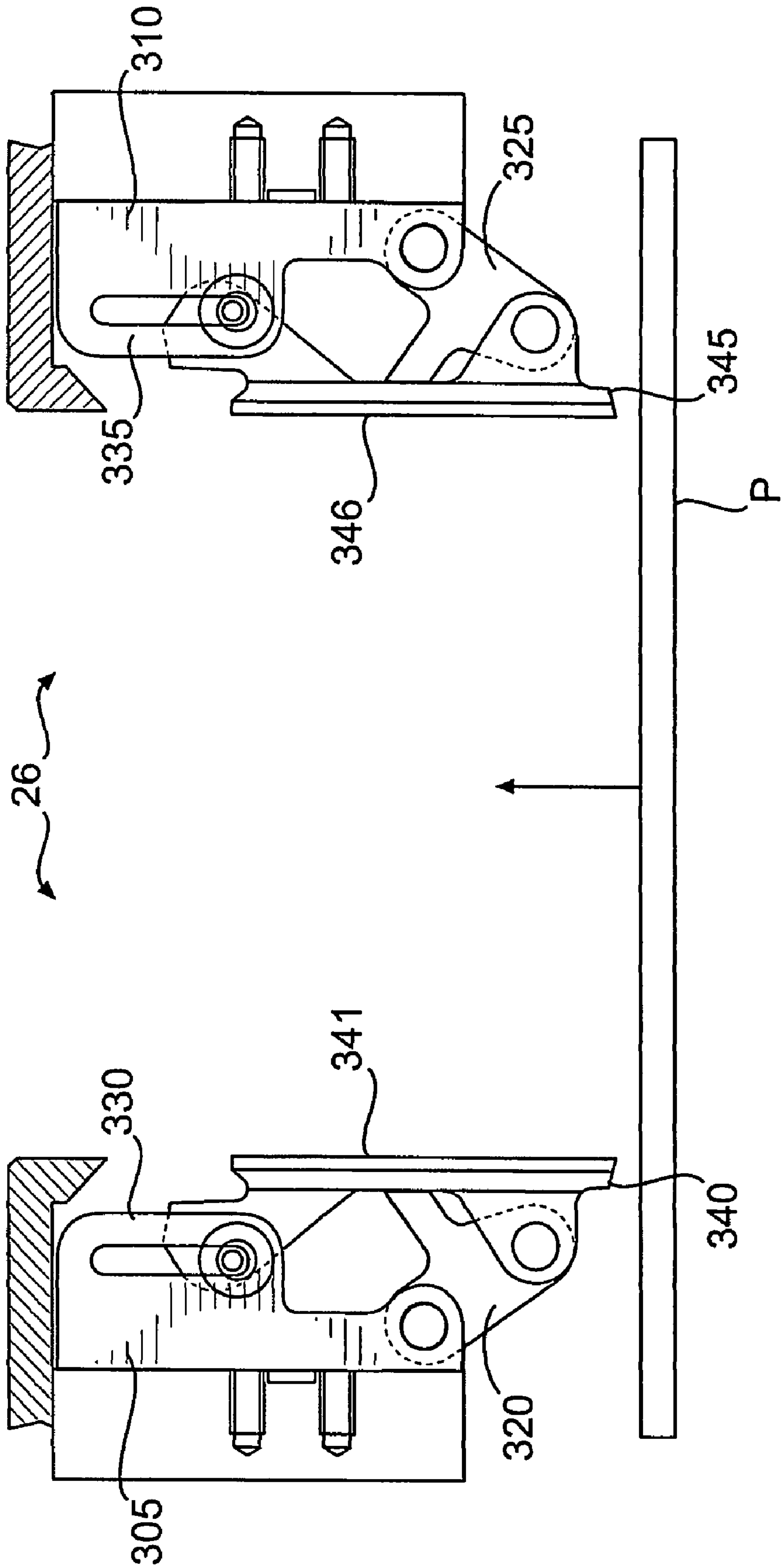
Figure 4C:
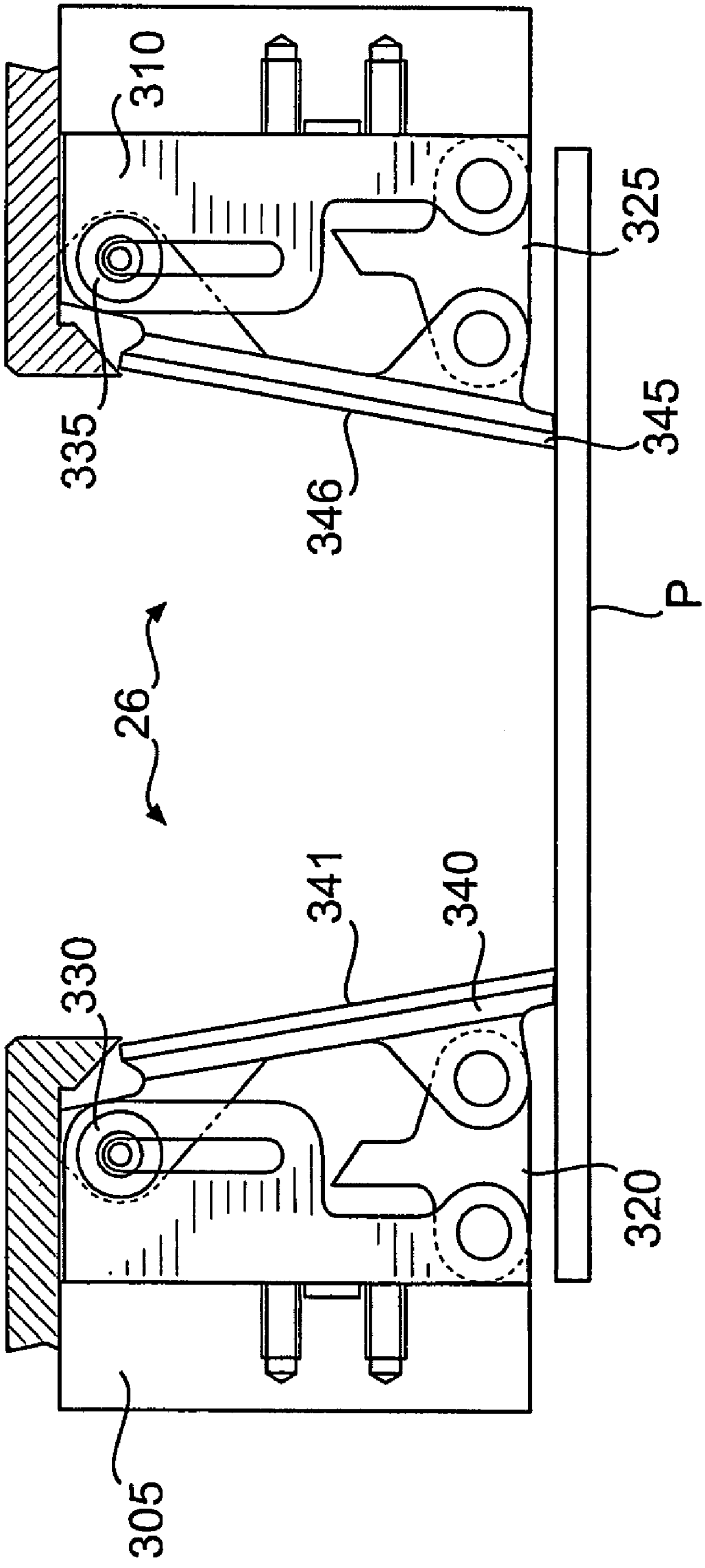

When the distance between the pallet P and the mold assembly A is such that the pallet P begins to contact the end liners 340 and 345, as illustrated in FIG. 4B, the end liners 340 and 345 may be forced into a closed position, as illustrated in FIG. 4C. Thus, the pallet P essentially closes the opening at the bottom of the mold cavity 26, and forms the bottom wall of the mold cavity 26. In the position illustrated in FIG. 4C, the product forming surfaces 341 and 346 may form the side walls of the mold cavity 26 and division plates 22 (illustrated in FIG. 1) may form the front and back walls of the mold cavity 26.

Figure 4D:
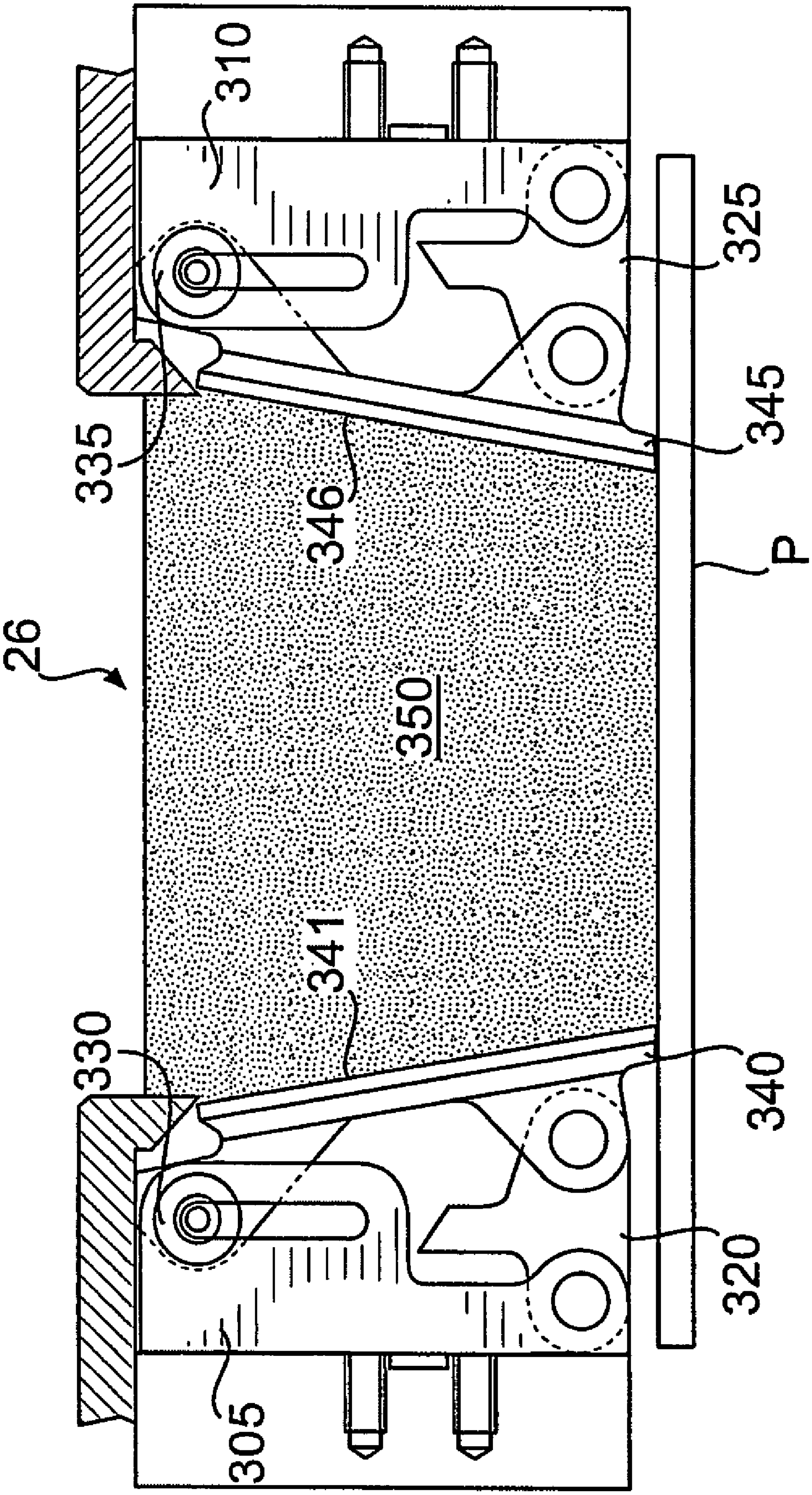

As illustrated in FIG. 4D, each mold cavity 26 may then be filled with a moldable material (e.g., a composite material such as concrete) which may be permitted to remain in the mold cavity 26 until it becomes a self-sustaining molded product 350. During this step, the pallet P or mold assembly A may be vibrated to allow the moldable material to better settle. Typically, the vibration is accomplished by setting the pallet P on a vibrating table (not shown) during manufacturing. However, it is contemplated that the present invention may be used in conjunction with any conventional means for vibrating the pallet during manufacturing. Because the product forming surfaces 341 and 346 may be configured at angle Θ, as illustrated in FIG. 3B, the product 350 may have a negative taper, i.e., it may be narrower at the bottom (where it is supported by pallet P) than at the top.

Figure 4E:
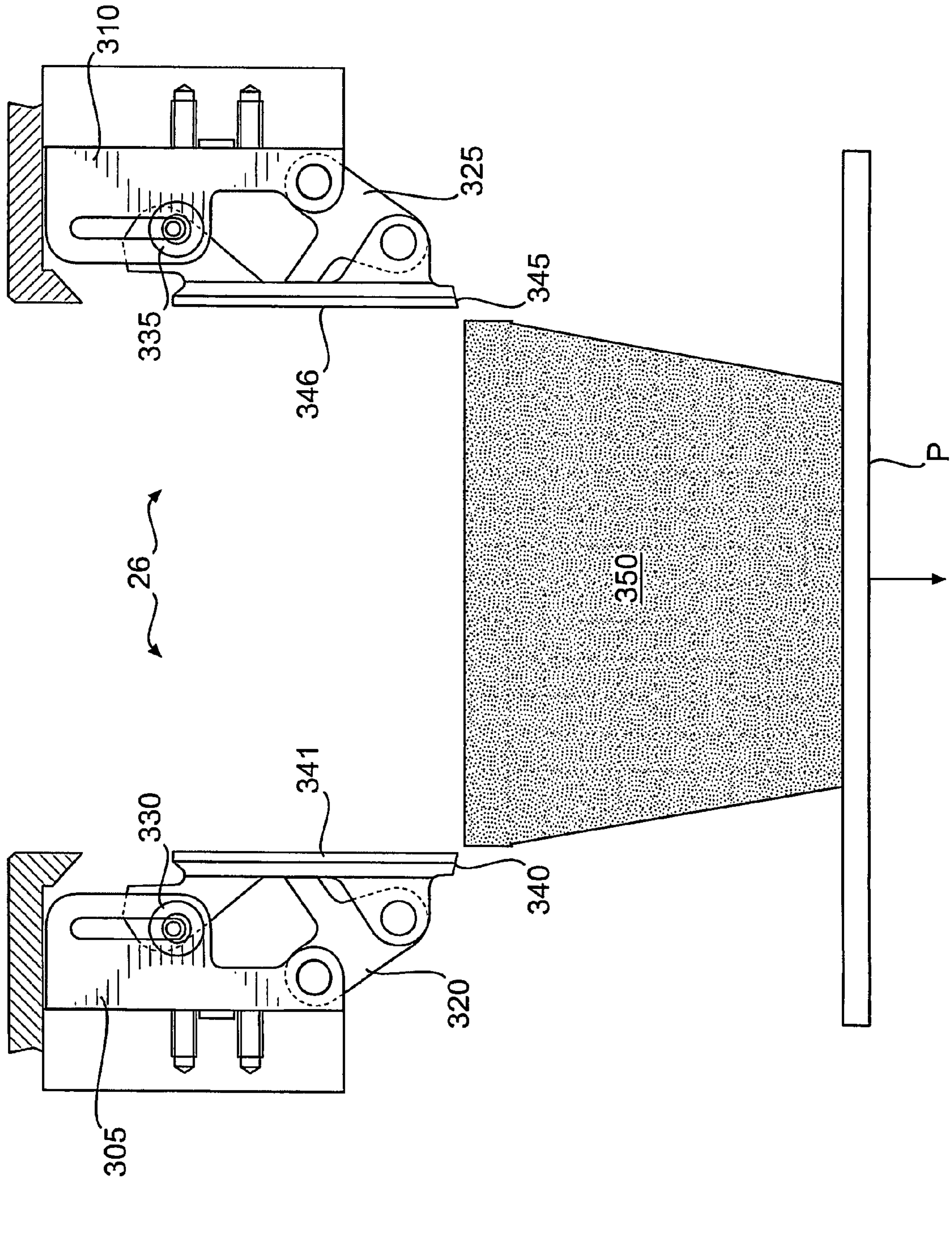

Once the molded product 350 is ready for demolding, the mold assembly A may be separated from pallet P by relative vertical movement, as illustrated by the arrows in FIG. 4E. As this separation occurs, the upward force on pallet P on the end liners 340 and 345 may be relieved and the end liners 340 and 345 may be permitted to move both vertically and horizontally into the open position under the influence of gravity and by lateral force applied against them by product 350 as it moves downwardly relative to the mold assembly A. It should be noted that the movement of the end liners 340 and 345 is delayed when the product 350 begins to move downwardly relative to the mold assembly A due to the pivot and slide connections of the elements in the movable side walls 28. This avoids the prior art problems associated with pivoted walls because it prevents the end liners 340 and 345 from become dislodged during the vibration step discussed above. That is, because the product 350 must move a predetermined distance in the vertical direction which is greater than the movement the product 350 would experience during vibration, the end liners 340 and 345 stay in place during the vibration step.

As illustrated in FIG. 4E, molded product 350 may remain on the pallet P as the demolding process occurs. The separation of mold assembly A and pallet P may continue until all of the molded products 350 in mold assembly A are clear of the end liners 340 and 345. In one exemplary embodiment of the present invention, the entire process of forming and demolding a tapered block may occur in approximately fourteen seconds. However, this period may be shorter or longer depending on the type of machinery and materials used to manufacture the blocks, or the type of blocks being manufactured.

The apparatus and method of the present invention thus permit simple, automatic demolding of high quality tapered molded products by separating the mold assembly A and the pallet P on which the products 350 are formed and supported. The apparatus is simple in construction, and in at least one embodiment, does not require any external power or control devices to effect movement of the end liners 340 and 345.

While the above discussion relates to molded products having two tapered edges, it is contemplated that the apparatus and method of the present invention may be utilized for forming asymmetrical molded products. For example, a mold cavity 26 may be configured to have only one movable end liner and three fixed mold walls to form an object having only one negatively tapered side. Alternatively, a molded product having more than two negatively tapered sides may be produced by utilizing a mold cavity 26 having more than two movable end liners.

Furthermore, while the movement of the end liners 340 and 345 is discussed above as being effectuated by gravitational forces, it is contemplated that additional forces may be applied to the various elements of the end walls 28. For example, a separate machine may be configured to push or pull one or more of the various elements to cause the end liners 340 and 345 to move between the open configuration (as shown in FIG. 3B) and the closed configuration (as shown in FIG. 3A).

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A mold for forming a molded product having at least one tapered wall, said mold comprising:

a frame; and at least one mold cavity, said at least one mold cavity having a plurality of cavity walls defining the sides of said mold cavity, and said at least one mold cavity having an open top through which moldable material can be introduced into said mold cavity;

wherein at least one of the plurality of cavity walls is a movable wall, the movable wall comprising:

a stationary element attached to said frame, said stationary element having a groove;

a pivot element having first and second pivot points horizontally disposed with respect to one another only along a substantially straight horizontal line extending therebetween, which is parallel to a main surface of a pallet and perpendicular to a vertical sectional plane of the mold when the mold is in a closed position, said pivot element being rotatably attached to said stationary element via said first pivot point; and a movable element having a planar product forming surface, said movable element being slidably and rotatably attached to the groove of said stationary element and said movable element being rotatably attached to said pivot element via said second pivot point, such that said movable element is capable of moving between a first position and a second position, wherein said first pivot point is directly connected to said stationary element, wherein said mold moves toward the pallet such that the pallet directly contacts and engages said movable element and forces said movable element from the first position to the second position, and wherein said mold permits demolding of the molded product when said mold moves vertically away from said pallet, and the vertical and horizontal movement of the movable element from the second position into the first position is delayed due to the slidable and rotatable connections of the movable element.

2. The mold according to claim 1, wherein said at least one mold cavity includes two movable walls.

3. The mold according to claim 2, wherein the two movable walls oppose one another within said mold cavity.

4. The mold according to claim 1, wherein said mold moves toward the pallet using production machinery.

5. The mold according to claim 1, wherein:

when said movable element is in the first position, a plane of a planar product forming surface is configured to be substantially vertical and at least a portion of said movable element extends below a bottom of said mold, and when said movable element is in the second position, the plane of the planar product forming surface is configured at an angle with respect to vertical.

6. The mold according to claim 5, wherein when said movable element is in the second position, moldable material is introduced into said at least one mold cavity to form a molded product having at least one tapered wall.

7. The mold according to claim 1, wherein said movable element is slidably and rotatably attached to the groove of said stationary element using a cam.

* * * * *